United States Patent
Hottinen et al.

(10) Patent No.: US 8,331,280 B2
(45) Date of Patent: Dec. 11, 2012

(54) METHOD, APPARATUS AND COMPUTER PROGRAM FOR RELAY SELECTION

(75) Inventors: Ari Hottinen, Espoo (FI); Emanuele Viterbo, Turin (IT)

(73) Assignee: Nokia Corporation, Espoo (FI)

( * ) Notice: Subject to any disclaimer, the term of this patent is extended or adjusted under 35 U.S.C. 154(b) by 720 days.

(21) Appl. No.: 12/156,208

(22) Filed: May 30, 2008

(65) Prior Publication Data
US 2009/0296626 A1 Dec. 3, 2009

(51) Int. Cl.
H04B 7/14 (2006.01)
(52) U.S. Cl. ........................................... 370/315
(58) Field of Classification Search .............. 370/229, 370/235, 238, 310, 315, 328, 338; 455/7, 455/11.1
See application file for complete search history.

(56) References Cited

U.S. PATENT DOCUMENTS

| | | | |
|---|---|---|---|
| 5,898,679 A * | 4/1999 | Brederveld et al. | 370/315 |
| 6,788,670 B1 | 9/2004 | Larsson | 370/351 |
| 7,184,703 B1 * | 2/2007 | Naden et al. | 455/10 |
| 7,428,229 B2 * | 9/2008 | Bonta et al. | 370/338 |
| 7,684,337 B2 * | 3/2010 | Mehta et al. | 370/238 |
| 8,064,823 B2 * | 11/2011 | Hottinen et al. | 455/11.1 |
| 8,068,438 B2 * | 11/2011 | Sartori et al. | 370/252 |
| 2004/0131025 A1 * | 7/2004 | Dohler et al. | 370/328 |
| 2006/0002303 A1 * | 1/2006 | Bejerano et al. | 370/238 |
| 2006/0056329 A1 * | 3/2006 | Ookuma | 370/315 |
| 2007/0160014 A1 * | 7/2007 | Larsson | 370/338 |
| 2007/0165581 A1 * | 7/2007 | Mehta et al. | 370/338 |
| 2008/0031250 A1 * | 2/2008 | Mehta et al. | 370/392 |
| 2008/0075033 A1 * | 3/2008 | Shattil | 370/328 |
| 2008/0144562 A1 * | 6/2008 | Draper et al. | 370/315 |
| 2008/0165720 A1 * | 7/2008 | Hu et al. | 370/315 |
| 2009/0017753 A1 * | 1/2009 | Kim et al. | 455/10 |
| 2009/0227202 A1 * | 9/2009 | Doppler et al. | 455/11.1 |
| 2009/0268657 A1 * | 10/2009 | Alexiou et al. | 370/315 |
| 2010/0091697 A1 * | 4/2010 | Vucetic et al. | 370/315 |
| 2010/0214934 A1 * | 8/2010 | Conan et al. | 370/252 |
| 2010/0317284 A1 * | 12/2010 | Charbit et al. | 455/7 |
| 2011/0019608 A1 * | 1/2011 | Dohler et al. | 370/315 |

FOREIGN PATENT DOCUMENTS

| | | |
|---|---|---|
| KR | 2003-0059215 A | 7/2003 |
| WO | WO-02/35779 A2 | 5/2002 |

OTHER PUBLICATIONS

Hottinen, A. et al., "Delay-Differentiated Scheduling in a Randomized MIMO Relay Network", pp. 1313-1316, EUSIPCO, Poznań 2007.

* cited by examiner

*Primary Examiner* — Chi Pham
*Assistant Examiner* — Robert Lopata
(74) *Attorney, Agent, or Firm* — Harrington & Smith

(57) ABSTRACT

First are determined which relays are available between at least one source and at least one destination, and from them are selected a subset of those relays for an activation interval under a constraint of equal transmit energy per selected relay across the activation interval. A matrix is formed, using CSI received from the relays, to evaluate each effective channel between source and destination that goes through each of the relays, including multi-relay hops, and the relays are selected from that matrix. Utility of source-relay pairing is evaluated in view of the relay-destination channel and the pairing enables relays to multiplex multiple sources where feasible.

33 Claims, 3 Drawing Sheets

METHOD, APPARATUS AND COMPUTER PROGRAM FOR RELAY SELECTION

TECHNICAL FIELD

The teachings herein relate generally to relay networks using wireless relay nodes between a source and destination, and specifically relate to selecting which of several available relay nodes are to be used for relaying between the source and destination.

BACKGROUND

The following abbreviations are herewith defined:
3GPP third generation partnership project
CSI channel state information
DM diversity multiplexing
DVB-H digital video broadcast for handheld devices
eNB evolved node B (of an LTE system)
E-UTRAN evolved UTRAN (also known as LTE or 3.9 G)
i.i.d independent and identically distributed
LTE long term evolution of 3GPP
MI mutual information
Node B base station or similar network access node
UE user equipment (e.g., mobile equipment/station)
UMTS universal mobile telecommunications system
UWB ultra wideband
UTRAN UMTS terrestrial radio access network
WiMAX world interoperability for microwave access Wireless relay networks are the environment of these teachings, such as for example WiMAX, E-UTRAN (also known as 3.9 G), UWB systems and DVB-H. Certain wireless relaying offers benefits such as easy and fast network deployment, low cost of installation and maintenance, flexibility, and scalability in both size and density. Coverage probability increases exponentially with the number of relay nodes in the network. Additionally, the use of multiple relays for a single message increases diversity in the signal.

The following papers employ system models not unlike the relay environment of these teachings. J. Nicholas Laneman and Gregory W. Wornell [DISTRIBUTED SPACE-TIME-CODED PROTOCOLS FOR EXPLOITING COOPERATIVE DIVERSITY IN WIRELESS NETWORKS; IEEE Transactions on Information Theory, vol. 49, no. 10, pp. 2415-2425, October 2003] proposes space-time coded cooperative diversity protocols achieving full spatial diversity gain (i.e., the diversity order equals the number of relay terminals). Y. Jing and B. Hassibi [DISTRIBUTED SPACE-TIME CODING IN WIRELESS RELAY NETWORKS; IEEE Transactions on Wireless Communication, vol. 5, no. 12, pp 3524-2536, December 2006] analyzes distributed linear dispersion space-time coding schemes and show that a diversity order equal to the number of relay terminals can be achieved. Kambiz Azarian, Hesham el Gamal and Philip Schniter [ON THE ACHIEVABLE DIVERSITY-MULTIPLEXING TRADEOFF IN HALF-DUPLEX COOPERATIVE CHANNELS; IEEE Transactions on Information Theory, vol. 51, no. 12, pp. 4152-4172, December 2005] assume the presence of a direct link between source and destination, and shows that an extension to the multi-relay case previously introduced in R. U. Nabar, H. Bolcskei, and F. W. Kneubuhler [FADING RELAY CHANNELS: PERFORMANCE LIMITS AND SPACE-TIME SIGNAL DESIGN; IEEE J. Selected Areas of Communication, vol. 22 no. 6, pp 1099-1109, August 2004] is optimal for a diversity-multiplexing (DM) tradeoff.

But in addition to the above specific teachings as to enhancing diversity, there is the practical problem of deciding which of several relay nodes are best suited for acting as relay between a particular source and destination, in particular in the presence of several source nodes and when the relay resources need to be shared by the source nodes. As relay nodes become more prevalent there will be occasions where two or more relay nodes have the capability (due to physical positioning, quality of signal received from the source, available bandwidth/radio resources, etc.) to act as relay for a particular communication. Allowing or requiring each node that can potentially relay a received communication from a source to its destination to actually relay that communication is seen to lead in some instances to diminished data throughput in the cell. While employing all available/capable relays for a single source-to-destination communication may increase diversity for that communication, it is clear that certain diversity increases would surpass the point of diminishing returns and not provide a sufficiently offsetting benefit. Furthermore, as stated above, often the relay nodes cannot be used simultaneously by all concurrent sources, and thus their use has be controlled in a fair an efficient manner to increase the lifetime of the network and to improve the capacity of the relay network.

Relevant teachings in this respect may be seen at a paper by A. Hottinen and T. Heikkinen [DELAY-DIFFERENTIATED SCHEDULING IN A RANDOMIZED MIMO RELAY NETWORK; EUSIPCO, Poznań 2007]. This paper details the destination as scheduling the transmission of possibly delay-differentiated services of M sources which go through R relays in a manner that accounts for both efficiency and fairness in the scheduling. In that paper the system model assumes relays having only one transmit and receive antenna while the overall relay network (source-to-destination channel) is MIMO (the sources and destination nodes employ multiple antennas in their communications). In this paper all relays are used by the source that is scheduled.

In practice, all potential relay nodes cannot serve a single source node. In such a case, relay selection problem occurs. The system has to decide how to optimally share the available relays among the competing source nodes. Relay selection that is optimal in terms of network throughput is a difficult problem and no optimal solutions are seen in the prior art. Iterative greedy solutions exist where the best relays are selected in a round-robin fashion by transmitters or the network. What is needed in the art is a way to select one or more relay nodes from among a plurality of available relay nodes for relaying a communication between source and destination in a manner that accounts for data throughput in the cell.

SUMMARY

In accordance with an exemplary embodiment of the invention is a method that includes determining a plurality of relays that are available between at least one source and at least one destination, selecting a subset of the plurality of relays for an activation interval under a constraint that comprises relay transmit energy per activation interval, and causing at least one of the relays of the subset to relay between the at least one source and the at least one destination during the activation interval.

In accordance with another exemplary embodiment of the invention is a device that includes a processor and a transmitter. The processor is configured to determine from received transmissions a plurality of relays that are available between at least one source and at least one destination, and is further configured to select a subset of the plurality of relays for an activation interval under a constraint that comprises relay transmit energy per activation interval. The transmitter is configured to cause at least one of the relays of the subset to relay between the at least one source and the at least one destination during the activation interval.

In accordance with still another exemplary embodiment of the invention is a computer readable memory embodying a program of instructions for causing a processor to take actions directed toward selecting relays. In this embodiment the actions include determining a plurality of relays that are available between at least one source and at least one destination, selecting a subset of the plurality of relays for an activation interval under a constraint that comprises relay transmit energy per activation interval, and causing at least one of the relays of the subset to relay between the at least one source and the at least one destination during the activation interval.

These and other aspects are more particularly detailed below.

BRIEF DESCRIPTION OF THE DRAWINGS

The foregoing and other aspects of these teachings are made more evident in the following Detailed Description, when read in conjunction with the attached Drawing Figures, wherein.

DETAILED DESCRIPTION

Figure 1:
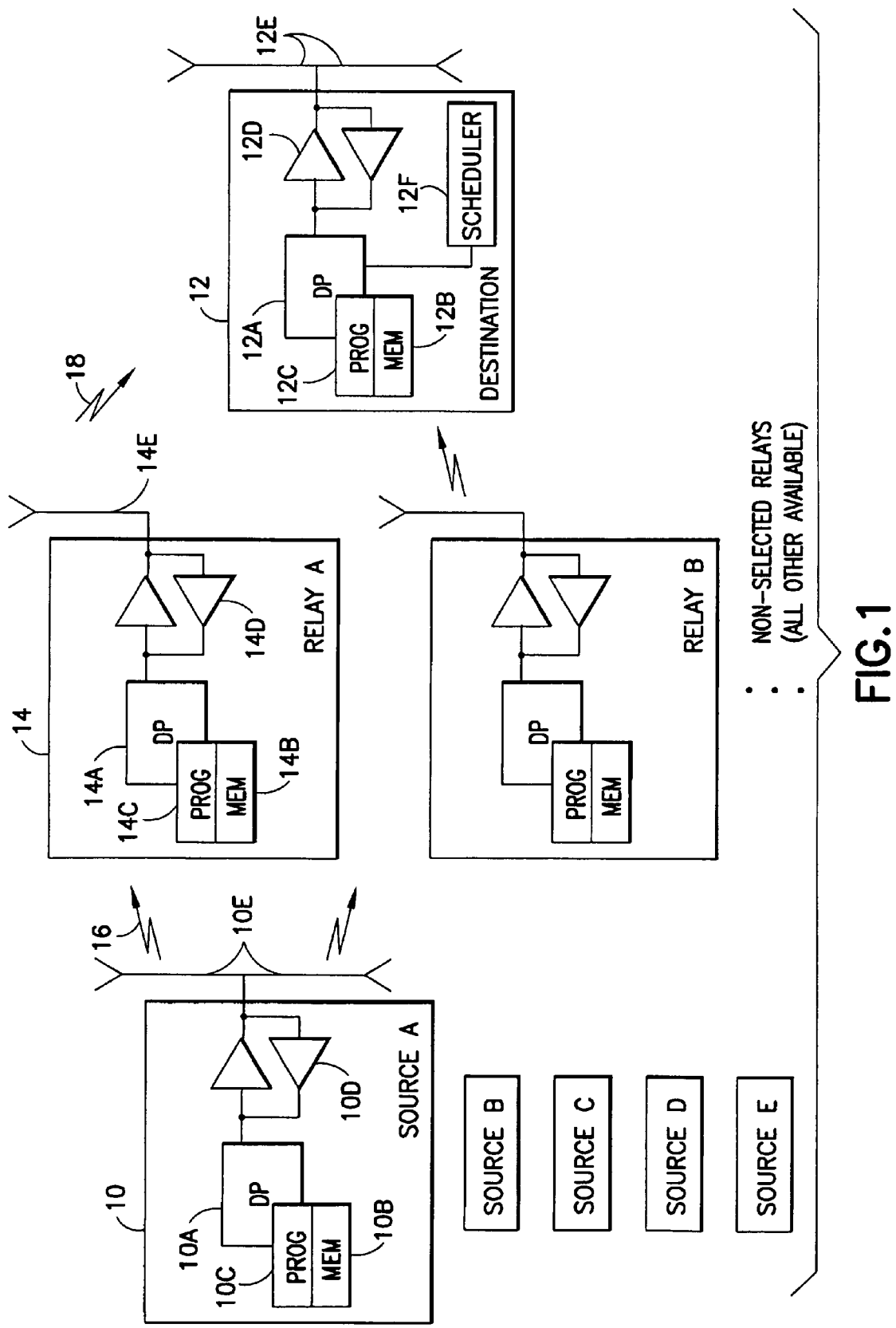
FIG. 1 shows a simplified block diagram of various electronic devices that are suitable for use in practicing the exemplary embodiments of this invention

Embodiments of this invention are particularly advantageous for use in a relay system, though as noted above such embodiments are not limited to any particular wireless relay protocol. The choice of best relay node may change with time based on exactly how the 'best' relay is decided, and so we introduce the concept of relay activation interval as a time interval during which the choice is valid. The relay activation interval may be considered a scheduling window such as a fixed number of one or more consecutive transmission slots (the number fixed by whatever wireless protocol is operative in the system). Additionally, to facilitate diversity two or more relay nodes may be selected as 'best' for a particular source-to-destination communication. Therefore a subset of k relay nodes are decided/selected from among K available relay nodes according to these teachings, where k is a positive integer that varies from 1 to K. The subsets selected to serve different source nodes are at least partly different. One or more relay nodes serving source A is different that the relay nodes serving source B. Where reverse communications from destination to source are also relayed, that same source-to-destination subset may be used, or the decision process may be started anew to select a different subset or different subsets for each destination.

Embodiments of this invention provide a channel-aware relay selection scheme that improves relay system capacity as compared to the prior art. In addition to improving capacity, the selection scheme facilitates a "fair" use of relays in the sense that each relay included in the selection algorithm is activated a given number of times or consumes power in proportion to available power designated for relaying. If the "relaying power budget" of a given relay node is diminishing, this relay node can inform this information either implicitly or explicitly to the relay selection unit. The scheduling unit takes this information account and reduces its usage. In a special case, if the relaying power budget is zero, the relay node is removed from the set of available relay nodes. In an embodiment transmit energy is the algorithm's selection constraint, where transmit energy among the relays within one relay scheduling interval is equalized or made nearly so. With nearly equal power per relay, the power (or energy) budget can be controlled so that relay nodes with less battery power are removed from the set of available relay nodes temporarily. As an example, relay nodes with excess power belong to the set of available relay nodes in each slot, but energy or power limited relay nodes only every Nth slot, where N>1. In this example the relay activation interval is a slot, and the N>1 limit assures that the power limited relay will be considered as available only in the periodic Nth slots/relay activation intervals. The relays can be selected so that at least two transmitting nodes can coexist in the channel simultaneously.

One context in which a relatively equal number of relay usages becomes important is in E-UTRAN. In current discussions of E-UTRAN, there is considered the possibility that individual UEs might act as relay nodes while they are active in a network cell, and so at any given time there may be a multitude of possibilities as to which relay node is to function as a relay for a specific communication. In that instance it becomes important to allocate the relay function of the various potential relaying UEs in a fair manner, so that no particular UE is overburdened with expending its limited power supply for relaying as compared to other UEs in the cell, or to the transmission of the UE's own data. In this case, the UE may have a different power/energy budget for relaying and for transmitting its own signal. The UE may decide on the energy budget for relaying and send the scheduling unit (or relay selection unit) related information for use in relay selection decisions. Thus the 'fair' usage concept becomes important when the vision of relays is taken beyond the bounds of network-operated, fixed (or mobile, e.g., train-mounted) relays with a hardwire power source.

In general terms, exemplary embodiments of the invention consider all single relays and all relay pairs (or pairs of relay subsets) in a given geographic area, and determine in one or multiple relay activation intervals which relays are to be used under the constraint that all relays transmit the same energy or with some controllable but fixed energy within said interval. In different scheduling slots (in which a particular subset of relays are activated/selected), the input for the relays may originate from different sources. The scheduling slots are any essentially orthogonal channel or subchannel resources such as time slots, frequency slots or (quasi-)orthogonal spatial channels (beams) which enable multiplexing of several users. Thus, the solutions detailed below include scheduling schemes that enable multiplexing of those different sources.

In the below description the examples assume the sources are UEs and the destination is an access node/eNB/base station. This is exemplary only and not limiting to the invention but simply a convenient paradigm for explanation; these teachings apply also to the network as source and the UE as destination. The data multiplexed and transmitted by the relay node may include also data from itself as UE (which data is not truly being relayed) or all data originating only from sources external of that relay node. The multiplexed transmission may have some data directed to the access node as destination and other data directed to another UE within one-hop range of the transmitting relay (though this assumes the destination UE is listening at the proper time and frequency resource). When reviewing the examples specified below other variations may become apparent to those skilled in the wireless arts and such examples therefore remain within the scope of these teachings.

Before describing the exemplary embodiments in detail, first with reference to FIG. 1 is described certain apparatus that are suitable for practicing the invention in the environment of a fading relay network, where a source 10 (sources A, B, C, D and E shown) to destination 12 terminal pair communicates through a set of half-duplex single-antenna relays 14 (relays A and B shown, others available but not shown) using a two-hop protocol of source-relay-destination with linear processing at the relay level. Using conventions employed below, the sources are indexed as k=1, 2, ... K; and the relays are indexed as j=1, 2, ... J, where K and J are positive integers and J is at least two.

Any individual source 10 has $n_t$ transmit antennas 10E and the destination has $n_r$ receive antennas, where $n_r$ and $n_t$ are positive integers at least equal to one and not necessarily equal to one another. While not shown, any of the relays 14 may also have more than one antenna for reception and/or relay transmission. There are a total of J relays, and a subset of them are selected for relaying from the source 10 to the destination 12. While relaying from that particular source, any individual one of the relays 14 may also transmit multiplexed communications that are received individually from any of the other sources, so for example relay A may transmit (as an activated relay) data to the destination 12 that is a multiplexed stream from source A and source B, relay B may transmit (as an activated relay) data to the destination 12 that is a multiplexed stream from source A and source C and source E, etc. In this manner there are selected source-relay pairs which may change from slot to slot even where the activation interval spans more than one slot. The subset of relays selected for relay from source A may differ from the subset of relays selected for relay from source B, and the subsets need not be mutually exclusive in any particular relay activation interval.

The source 10 and the destination 12 may be respectively a user equipment UE and a network node B/base station BS for example, in either order, or they both may be UEs in an ad hoc network that uses relays. Communications from the source 10 flow through the selected subset of relays, which each re-transmit to the destination 14. While not considered in detail below, there may also be a direct link between the source 10 and the destination 14, which adds diversity to the overall scheme but that diversity is additive to the advantages detailed below respecting the selected subset of relay(s). Two identical relays are shown, but as will be evident from below any positive integer number selected as a subset from all available relays J may be used to advantage using these teachings. The relay nodes need not be identical but may still process similarly according to these teachings. A relay node may be, for example, a mobile terminal/mobile station, a fixed wireless node, or any of the various other implementations noted above. A relay may operate in decode and forward and amplify and forward mode, as an example. In decode and forward mode, the relay needs to know at least some signaling parameters of the incoming source signal, such as used sub-carrier of source node transmission, spreading code, modulation alphabet, etc., in order to be able to decode or detect the signal it receives. In this case, the relay node cannot tolerate much interference at the relay input since this could easily cause a near-far effect in which a dominating interference signal would degrade the detection/decoding performance. On the other hand, with amplify and forward relaying, the relay node can be beneficial even with interference since in this mode the relay simply re-transmits the signal it receives after amplifying and does not decode that received signal, but the amplify and forward mode may enhance the received noise excessively.

Each of the relays 14 includes a data processor (DP) 14A, a memory (MEM) 14B that stores a program (PROG) 14C, and a suitable radio frequency (RF) transceiver 14D for bidirectional wireless communications with the source 10 and the destination 14. Each of the source 10 and the destination 12 also includes a respective DP 10A/12A, a MEM 10B/12B that stores a PROG 10C/12C, and a suitable RF transceiver 10D/12D. The wireless source to relay link 16 and the relay to destination link 18 are shown as unidirectional since the description below is from source to destination, but the relays may be used by these teachings for bidirectional communications also or a different subset of relays may be used for different direction links between the source 10 and destination 12. The relays, the source 10 and the destination 12 communicate over the wireless links 16, 18, each using one or more antennas 10E/12E/14E, and MIMO techniques already known or yet to be developed may be used to increase throughput through the system without departing from these teachings. At least one of the PROGs 10C/12C/14C is assumed to include program instructions that, when executed by the associated DP, enable the electronic device to operate in accordance with the exemplary embodiments of this invention, as will be discussed below in greater detail.

Further, when the destination 12 is embodied as an access node, it may also include a scheduler 12F for allocating radio resources to the various UEs in uplink and downlink (or sometimes allocating a block of resources to a network-controlled relay 14 for allocation to UEs under control of that relay), which may be signaled in a packet data control channel/allocation table as known in the art specifically for E-UTRAN. Generally, each of the various DPs 10A, 12A, 14A, include an oscillator (not specifically shown) that operates as a local clock for synchronous communications with the other apparatus of claim 1 with which they communicate over the links. The destination 12 operating as an access node periodically transmits/broadcasts a synchronization signal to maintain synchronization among those oscillators and to synchronize new UEs coming into the cell as is known in the art. By whatever means, there is a common time reference by which the various relays, sources and destination(s) know the bounds of the activation intervals. In certain embodiments, the destination/scheduler 12F runs the algorithm to determine the subset of relays and source-relay pairs, and signals that selection to the appropriate relays. In another embodiment, the various relays run the algorithm individually and independently and each come to the same conclusion since they use the same algorithm and same input data, and relay according to the outcome of that algorithm as it applies to itself as an individual relay.

In general terms, an exemplary embodiment of the invention considers all single relays and all relay (subset) pairs in a given geographic area, and determines in one relay activation interval which relays or relay subsets are to be used under the constraint that all relays transmit the same energy (or with some possibly controllable predefined energy) within that relay activation interval. As above, where the inputs for any particular relay originates from different sources (which itself may vary from slot to slot), an individual relay may send those received inputs from different users as a multiplexed output/transmit stream.

The algorithmic solution considers a performance measure at the destination receiver, where the performance measure includes the effective channel from sources via each feasible relay subset to the destination. The performance measure may be e.g. a two-hop MIMO capacity equation used in the above-noted paper by A. Hottinen, T. Heikkinen, "Delay differentiated scheduling in a multi-user MIMO relay," Proc.

EUSIPCO 2007. The measure is computed for different subsets of relay nodes and from these measures, the optimal pairs of relays and single relays are selected, subject to the constraint that all relays transmit the same energy. Algorithmically, the activated relay may be computed by the assignment algorithm, or similar linear programming based techniques. Consider an example with respect to FIG. 1. The destination/eNB 12 knows the effective channel from each relay A and B from past activity. It also knows or estimates the effective channel from the sources A, B, C, . . . to the relays they've used in the recent past, and can estimate other source-to-relay channels based on at least physical location relative to the relays A, B. Similar holds true for multi-relay options, either historical actual data or estimates from proximal locations. From this the eNB 12 computes the effective channel between source and all available relays. Considering only source A and relays A and B, the eNB can compute one channel for source A to relay A to eNB, another channel from source A to relay B to eNB, a third channel from source A to relay A to relay B to eNB, and a fourth channel from source A to relay B to relay C to eNB. These are the uplink channels; the downlink channels are simply the reverse channels.

If there is some central scheduling entity such as the eNB 12 shown at FIG. 1, the scheduling unit 12F of that entity may obtain channel state information CSI of different relay subsets, and use those CSI figures to compute an assignment matrix or assignment information. In the presence of multiple receive antennas at the destination node, the CSI can be related to the effective MIMO channel, composed of the effective channels from multiple sources to destination antennas. Furthermore, the CSI information used in the scheduling unit can also include information related to the available or used transmit power at a relay node within a relay subset. Thus, also the allocated transmit resources of the relay node affect the scheduling or subset decisions at the scheduling unit.

Relay power allocation can affect the relay selection task, and to keep the relay selection optimization task simple, embodiments of the invention keeps the energy fixed over the scheduling window/activation interval. The relays may be activated once or twice (or any number of times equal to or less than the number of slots in the interval). As to energy constraint, for example if a relay transmits with power P when alone, it then transmits with power P/2 when using two slots. In this manner the transmit/consumed energy is the same for that relay across the activation interval. However, if it is known a priori that one relay can transmit with higher power, then that information is transparent to the relay selection scheme. Embodiments of the invention can accommodate a priori any energy usage per relay, and this usage can depend on a relay specific energy budget too (e.g. remaining battery power).

Reference is made to the inventors' paper (hereby incorporated by reference) entitled OPTIMAL USER PAIRING IN DOWNLINK MU-MIMO WITH TRANSMIT PRECODING (RAWNET Conference, Berlin, March 2008). The constraints used in embodiments of this invention use matrix $x_{k,j}$ which is a permutation matrix, similar to the optimization problem in that related paper. In this manner, embodiments of the invention seek to activate each row and column only once of the matrix $\gamma_{k,j}$. In the relay selection problem, the diagonal of this matrix says that the jth relay is paired with itself (or not paired at all), whereas there is a source-relay pair (kth source paired to the jth relay) whenever an off-diagonal value is selected. The off-diagonal values can also refer to any two relay subsets. For example, element k,j can refer to subset k with relay indices 1, 3, 5 and subset j to relay with indices 2, 4, 6. Each relay in each subset is activated simultaneously each simultaneously transmitting subset forming one "virtual" relay.

This entails a bit further explanation of the signal model. In a downlink MU-MIMO system, the signal received by the relay receiver k is given by $$y^{(k)} = H^{(k)} \sum_{l=1}^{K} U^{(l)} x^{(l)} + z^{(k)} \quad [1]$$

where $H^{(k)}$ is the channel coefficient matrix to relay k, $U^{(l)}$ is the channel precoding/beamforming matrix to relay l, $x^{(l)}$ represents the transmitted vectors to relays l=1; : : : ; K containing N information symbols, and $z^{(k)}$ is a white Gaussian noise vector. Let P be the total transmitted power by the source node or the base station and signal to noise ratio SNR=P. Then the above equation can be re-written as an equivalent matrix of the form:

$$y^{(k)} = H^{(k)}[U^{(1)}| \ldots |U^{(k)}] \begin{bmatrix} x^{(1)} \\ \vdots \\ x^{(K)} \end{bmatrix} + z^{(k)} \quad [2]$$

In a downlink MU-MISO system (where in each relay receiver nr=1) only one stream is transmitted per relay node (N=1). The corresponding signal model is accordingly simplified to $$y = HUx + z \quad [3]$$

where U is the precoding matrix, the kth row of H corresponds to H(k) in equation [2], and the kth element of x designates the symbol transmitted to the kth relay node.

The precoding matrices can be determined e.g. using a matched-filter (MF) or zero-forcing (ZF) criterion. With MF, U=Hy and only the useful signal combines coherently when passing through the channel to relay k. Interference power is reduced due to incoherent combining. The ZF precoder is defined by the pseudo-inverse or by a generalized-inverse of the channel matrix H. While two specific precoders are described any other linear precoder could naturally be used.

The effect of the linear precoder is apparent in the signal-to-interference-and-noise ratio (SINR) of relay receiver k. Assuming uncorrelated source signals, where the transit power of each source is equal under a given total power constraint, the SINRs are given by $$\gamma_{(k)}(K) = \frac{[HU]_{kk}^2}{\sum_{j \neq k} [HU]_{kj}^2 + 1}, k = 1, \ldots, K \quad [4]$$

With zero-forcing precoding $[HU]_{kj}^2 = 0$ whenever $k \neq j$ and subsequently only the signal of interest penetrates the receiver. With a ZF precoder, the effective downlink channel from source to (selected) relay nodes decouples into non-interfering spatial subchannels. While these are only examples of possible preceding methods, it is apparent based on the previous description that ZF transmission reduces the interference power and thus reduces relayed interference in each following hop (relay-to-destination channel). Such a ZF transmission, or similar interference reduction transmission, is particularly relevant for decode and forward relays, since they cannot operate properly unless the received signal is amenable to successful decoding. A typical decode and forward relay would not relay the signal to the destination node if the signal received at that relay does not pass an error detection check (e.g. using cyclic redundancy check CRC codes embedded into the received source signal, and decoded at the relay). Hence, it is important to maximize the probability of successful decoding at the relay nodes via optimized source-relay link transmission.

The discussion immediately above relates primarily to source-relay channels, and does not take into account relay-destination channels. Indeed, the silent assumption is that each relay-to-destination channel is equally good. In practice, some relays may be closer to a destination node, and be thus preferred by a given destination node. Such distance or propagation loss-based relay selection is possible but suboptimal in a multiuser second hop link. When optimizing channel capacity, we need to consider the signal-to-interference ratio at each destination receiver of the relay-to-destination hop also, also even better the effective source-relay-destination channels for each possible relay subset selection. To this effect, the scheduling unit needs to know the effective performance for each relay subset selection, for the selected relay usage (amplify-forward, decode-forward etc) and preferably for each subset of destination receivers.

Now, the signal model above corresponds to one arbitrary channel use or slot. In this given slot up to nt users or sources transmit simultaneously potentially using transmit preceding. Now consider that the number of users or sources in any given slot is restricted to be at most two, K=1 or K=2 only, whereas the total number of users is $\tilde{K}$>2. Now jointly optimize the relay subset selection, or user pairing, and map the $\tilde{K}$ users to the available relays or slots, while ensuring that the energy allocated to each relay (over all assigned slots) is identical or otherwise fixed. This constitutes a fairness criterion for the relays.

Now consider a scheduling algorithm posed as a bipartite weighted matching problem (or linear assignment problem, or linear transportation problem) and solved efficiently via specialized algorithms. A similar scheduling problem may be considered for uplink relay-selection-based MU-MIMO systems in the absence of transmit preceding, where at most nr sources may transmit to a destination node in the same time-frequency slot with nr receive antennas. In both uplink (multiple-access channel) and downlink (broadcast channel) one of the relay nodes may be fixed, and one (but not all) of these nodes may even be the actual source node, in case a direct transmission to destination is also allowed. Then, the relay selection problem determines the relay node subset that will be designated to help a given source node or source antenna or beam. Thus when direct transmission is allowed, the source node may be interpreted as being a fixed relay node, and the remaining problem is to determine which external relay nodes to multiplex or combine with that fixed relay's transmission to the destination.

In order to keep the scheduling algorithm linear (or low-complexity), assume that the total number of available transmission slots (frequency or time slots, or both) depends only on the number of scheduled users $\tilde{K}$. In one instance, this can be accomplished if the paired users or source signals always access two slots whereas unpaired or single users, or those that do not want to be paired with a relay, access only one slot and transmit in one hop to the destination node. In particular, set the number of slots to be N=2$N_{pair}$+$N_{single}$=$\tilde{K}$, and assume that the number of relay nodes (or the number of virtual relay nodes, as described earlier) essentially equals the number of source nodes. The latter assumption is valid e.g. when different terminals or spatially separate source nodes are willing act as relays for another source node. In this case, the source nodes may distribute their data or information to other nodes using determined multiplexing sources (different time slots, frequency slots etc). Alternatively, if the relays act as full-duplex relays (which transmit and receive at the same time) the problem is to determine which full-duplex relay and which corresponding source node to activate during which transmission slot. Under this constraint, the scheduling algorithm has to determine which sources or relays are paired with which, and which are left unpaired to transmit alone (or be paired deterministically with a priori defined relay) in the channel. The $N_{single}$ unpaired sources, that only use one slot, can be allowed to double (or increase) their transmit power, in order to maintain (energy) fairness over consumed transmission slots. In addition to fairness, this constraint will also lead to comparable out-of-cell interfering power for each transmission slot. Naturally, by transmitting with double power, unpaired sources can employ a higher order modulation in order to increase their spectral efficiency and compensate for their use of only one slot.

The utility for pairing source/relay $k_1$ and source/relay $k_2$ is defined, as an example, as $$\gamma_{k1,k2} = \begin{cases} \gamma_{k1}(2) + \gamma_{k2}(2) \text{ if } k_1 \neq k_2, \\ \gamma_{k2}(1) \text{ if } k_1 = k_2 \end{cases} \quad [5]$$

where the notations for $\gamma_{k1}$ and $\gamma_{k2}$ are apparent from equation [4] with the interpretation that the model captures only channel information of nodes $k_1$ and $k_2$. The interpretation for $\gamma_{k1}$(1) is that only source $k_1$ transmits and the interference term in denominator obviously vanishes. Other utility functions can naturally be used as long they reflect the effect of having the two users cooperating. For example SISO pairing the utility can include log 2(1+$\gamma_{k1,k2}$) and with MIMO pairing (where destination channel is effectively MIMO), a conventional MIMO log-determinant capacity formula (see e.g. the Hottinen, Heikkinen paper reference earlier) can be used, where simultaneously (in a given slot) active relays constitute elements of a given row or column to the MIMO channel matrix at destination. With conservative pairing, the element of the assignment matrix can also include the minimum of the two utilities, rather than sum, for example.

The scheduling algorithm attempts to find the optimal permutation σ that maximizes the diagonal sum $$C = \max_\sigma \sum_k \sum_j \gamma_{k,\sigma(k)}. \quad [6]$$

This formulation states that in slot k source k and relay σ(k) are paired. If k=σ(k) the source is not paired (or is paired with some a priori defined relay node) and is transmitting alone or without access to the dynamically selected/optimized relay nodes. (e.g. with double power). Equation [6] is equivalent to solving:

$$\max_{x_{k,j}} \sum_k \sum_j \gamma_{k,j} x_{k,j}. \quad (7)$$

where $x_{k,j}$ is a permutation matrix, which again is analogous to the linear assignment problem at equation [3] or to the weighted bipartite matching problem, for which there exist many polynomial-time algorithms.

The $\gamma_{k,j}$ matrix is formed preferably using MIMO related measurements. This means that $\gamma_{k,j}$ depends on the matrix channel between nodes k and j to the destination (simultaneously activated interfering channels at relay to destination link).

Consider two different cases where the activation interval is a frame having multiple consecutive slots. In a first case where k<j, then in the first part of the frame source k is (tentatively or hypothetically) paired with relay j, and when k>j then this happens in the latter part of the frame. So, a source may be paired with two different relays during a particular scheduling interval. A scheduling interval may be defined as an interval or sequence of slots where scheduling decision are based on essentially the same optimization problem with the same input, regardless of how the scheduler signals these decisions. Solution to the optimization problem of eq. [6] or [7] determines $x_{k,j}$, the elements of the permutation matrix. When element (k,j) is non-zero (or 1), the in the k'th slot, source k transmits via relay j (with or without transmit beamforming) to the destination node. Note that two different sources or relays may be active simultaneously on the same time-frequency slot, as long as their possible interference is included when computing the performance matrix in eq. [6] or [7].

For embodiments wherein the matrix $x_{k,j}$ is not constrained to be a permutation matrix (or more precisely, if we remove the fairness constraints of matrix $x_{k,j}$ altogether), then the scheduler 12F selects for each slot in the frame the relays that maximize separately the capacity in each slot, even if this means using the same relay subset in all slots. This foregoes the 'fairness' aspects noted in above embodiments in favor of capacity maximization.

Note that other sources can also be used as relays as noted above, as long as they have some information related to each other's signals (e.g., they can use short range connectivity to give some part of their signal to each other).

So it can be seen that for a plurality of relays that are available between at least one source and at least one destination, a subset of them are selected, for an activation interval, under a constraint that comprises relay transmit energy per activation interval, or more specifically, that relay transmit energy per activation interval is equal transmit energy per selected relay across the activation interval. For the case where each relay executes the algorithm independently and acts on its own as the algorithm directs, then the individual relay causes itself to relay between the at least one source and the at least one destination during the activation interval. For the case where there is a centralized scheduling authority that directs the relays according to these teachings, then that centralized scheduler signals each of the selected relays to relay from its paired source or sources.

Selecting the subset of the plurality of relays may also be done by evaluating an effective channel from the at least one source to the at least one destination via multiple feasible subsets of the plurality of relays. This can be done specifically using channel state information CSI received at the at least one destination. It is known that available relays will signal to the eNB CSI for the link between the relay and sources under it, such as for example when the relays report buffer status to the eNB. Such CSI is therefore readily available to the eNB for evaluating the entire effective channel from source to eNB through any combination of the relays under the eNB's control, including using a one-hop or a two-hop multi-input multi-output MU-MIMO capacity equation. Thus the eNB can select specific source-relay pairs when selecting the subset of relays for any specific activation interval. As noted above, the activation interval across which power is held equal may span at least two consecutive slots and the source-relay pairing can vary among slots within the same activation interval while the relay transmission energy per activation interval constraint is satisfied.

Figure 2:
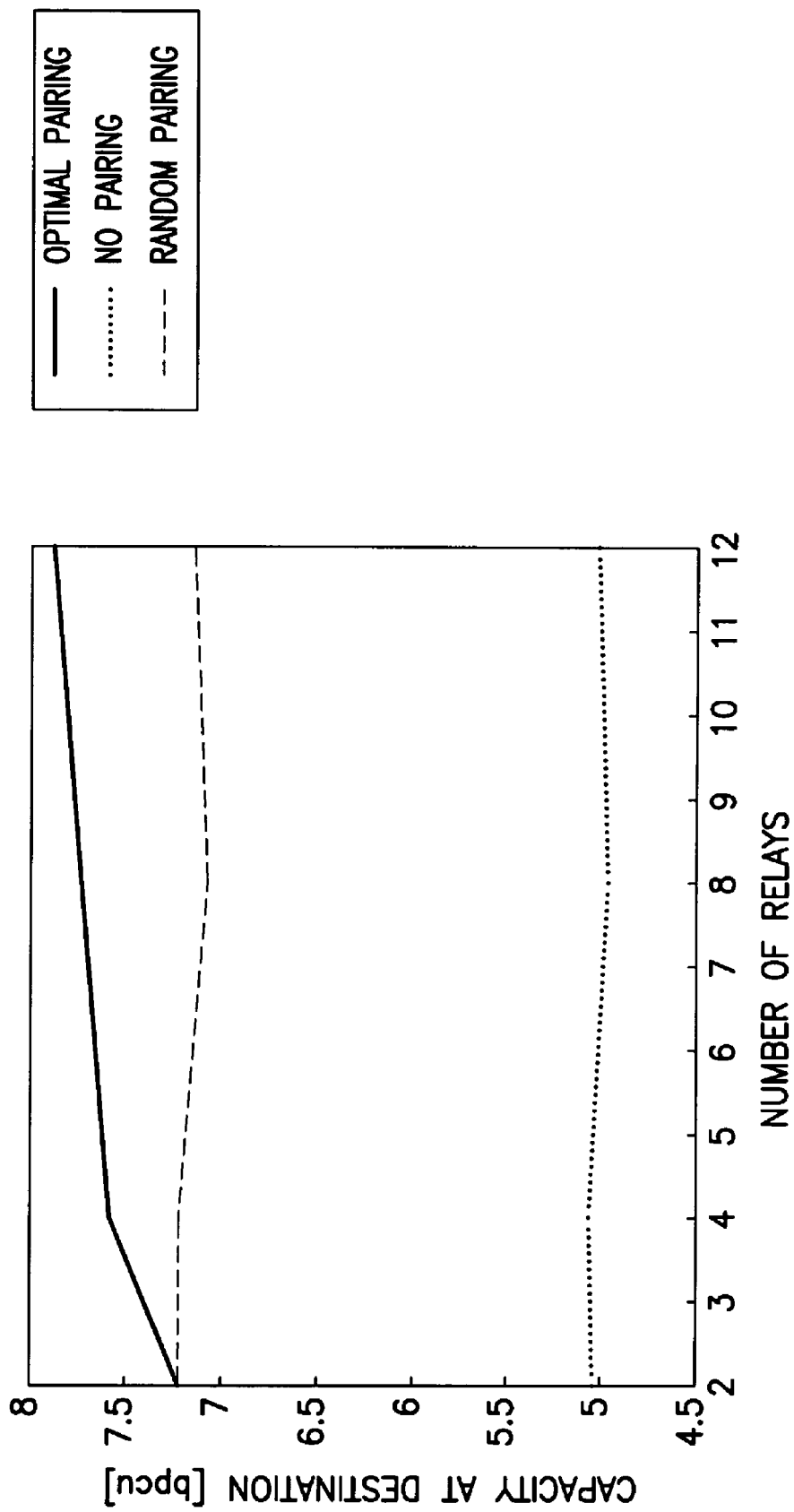
FIG. 2 is a graph of channel capacity versus number of relays using various pairing functions.

Fair use of relay nodes as noted above increases their lifetime. The relay nodes are selected so that the selection supports also spatial multiplexing, in that the source-relay pairs are selected and any relay can multiplex from multiple sources. This increases network throughput, as is seen at FIG. 2 which includes spatial multiplexing in the relay-to-destination link. FIG. 2 shows that when the number relays is increased, it is possible to find two relays that support spatial multiplexing (capacity increases as a function of relays). When pairing is not used, even random pairing, capacity is substantially reduced. Note that for FIG. 2 at most two relays are active (paired) at a given time. With "no pairing" only one source is active and also only one relay at any given time. With "random pairing" the two activated relays are randomly selected, which is clearly not sensible as it leads to poor performance.

Figure 3:
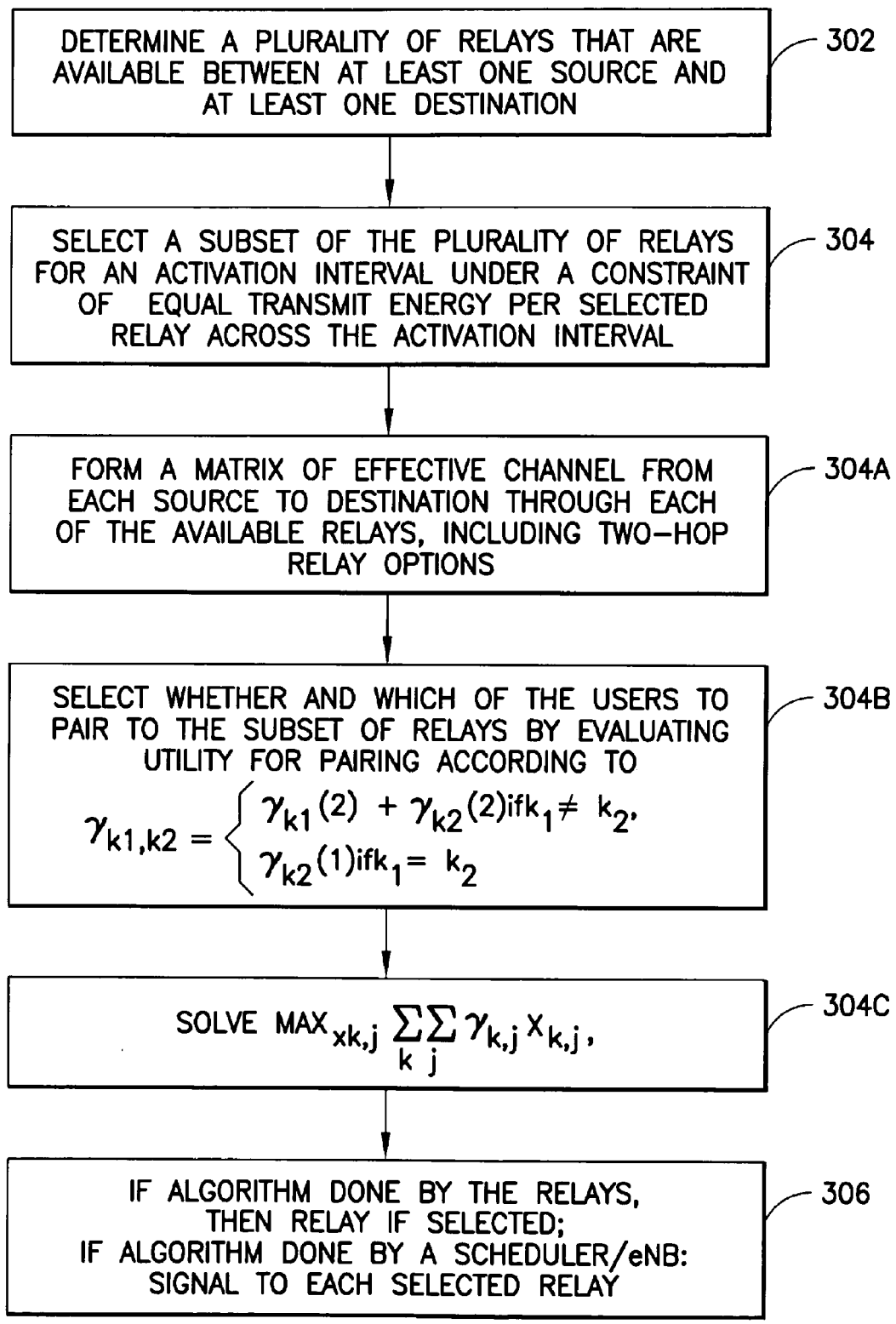
FIG. 3 is a process diagram showing exemplary process steps according to an embodiment of the invention.

FIG. 3 illustrates exemplary process steps according to an embodiment detailed above. At block 302 it is determined which relays are available for relaying between a source (one at a minimum) and a destination (also one at the minimum). At block 304 a subset of those available relays are selected for an activation interval, and the constraint by which they are selected is equal transmit energy per selected relay across the activation interval. This selection may be according to blocks 304A, 304B and 304C. At block 304A a matrix is formed of the effective channel for all possible variations of source to destination through a relay, including multi-hop options through two or more relays. At block 304B users are paired to individual relays of the selected subset by evaluating utility using the SINR function noted above with respect to equation [5]. At block 304C equation [7] is solved to match users to relays, which is equivalent to maximizing the diagonal sum for the C matrix of equation [6]. And at block 306 at least one of the relays is caused to relay form the source to the destination. For the case where each relay runs the algorithm independently, then if the relay is a selected relay it transmits to the destination the data it received from the source (either decode and forward or amplify and forward). If instead a network scheduler (e.g., eNB 12) runs the algorithm then that network node signals all of the selected relays to relay appropriately (which sources and which destinations for each).

Exemplary embodiments of this invention may be implemented by computer software executable by the DP 14A of the relay(s) 14 and the other DPs, or by hardware, or by a combination of software and/or firmware and hardware.

In general, the various embodiments of the UE 10 and relay(s) 14 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions. Similarly, the various embodiments of the destination 12 and the relay(s) 14 may be an access node (node B, E-Node B, base station, etc). In this case it may be the relay node (e.g., when operated by the network itself and not a UE acting as relay) is granted authority by the destination/Node B 12 to allocate resources using its own scheduler (not shown) or it may be that the relay node simply acts as an essentially passive amplify-and-forward node (e.g., either embodied as a UE or as a relay node operated by the network itself). The latter is the simpler implementation but the former is workable with additional coordination of scheduling between the affected relay node and the access node.

The MEMs 10B/12B/14B may be of any type suitable to the local technical environment and may be implemented using any suitable data storage technology, such as semiconductor-based memory devices, magnetic memory devices and systems, optical memory devices and systems, fixed memory and removable memory. The DPs 10A/12A/14A may be of any type suitable to the local technical environment, and may include one or more of general purpose computers, special purpose computers, microprocessors, digital signal processors (DSPs) and processors based on a multi-core processor architecture, as non-limiting examples.

Embodiments of this invention may be implemented by computer software 12C stored in the MEM 12B and executable by a data processor of the access node 12, such as the processor 12A shown, or by hardware, or by a combination of software and hardware. Similarly, other embodiments of the invention may be implemented by computer software 10C stored in the MEM 10B and executable by a data processor of the UE 10, or by hardware, or by a combination of software and hardware. Various other implementations may be embodied as computer readable software 14C stored in the MEM 14B of the various relay nodes 14 for execution by their respective DP 14A. Further in this regard it should be noted that the various logical step descriptions above and shown at FIG. 3 may represent program steps, or interconnected logic circuits, blocks and functions, or a combination of program steps and logic circuits, blocks and functions.

In general, the various embodiments may be implemented in hardware or special purpose circuits, software (computer readable instructions embodied on a computer readable medium), logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Various modifications and adaptations may become apparent to those skilled in the relevant arts in view of the foregoing description, when read in conjunction with the accompanying drawings. However, any and all modifications of the teachings of this invention will still fall within the scope of the non-limiting embodiments of this invention.

Although described in the context of particular embodiments, it will be apparent to those skilled in the art that a number of modifications and various changes to these teachings may occur. Thus, while the invention has been particularly shown and described with respect to one or more embodiments thereof, it will be understood by those skilled in the art that certain modifications or changes may be made therein without departing from the scope of the invention as set forth above, or from the scope of the ensuing claims.

We claim:

1. A method comprising:
   determining a plurality of relays that are available between at least one source and at least one destination;
   selecting a subset of the plurality of relays for an activation interval comprising a predetermined time interval, under a constraint that comprises relay transmit energy per activation interval, wherein the relay transmit energy during an activation interval remains the same throughout the activation interval, and wherein each relay selected for the subset is selected based at least in part on the relay's available power designated for relaying, and wherein the subset comprises more than one relay of the plurality of relays; and
   causing at least one of the relays of the subset to relay between the at least one source and the at least one destination during the activation interval.

2. The method of claim 1, wherein the constraint that comprises relay transmit energy per activation interval provides for substantially equal transmit energy of the selected relays with respect to one another during the activation interval.

3. The method of claim 1, wherein selecting the subset of the plurality of relays further comprises evaluating an effective channel from the at least one source to the at least one destination via multiple feasible subsets of the plurality of relays.

4. The method of claim 3, wherein evaluating the effective channel comprises using channel state information received at the at least one destination from each of the plurality of relays that are available.

5. The method of claim 4, wherein evaluating the effective channel comprises evaluating a two-hop multi-input multi-output capacity equation.

6. The method of claim 1, wherein the at least one source comprises a plurality of sources, and wherein selecting the subset of the plurality of relays comprises selecting individual relays and source-relay pairs.

7. The method of claim 6, executed by a scheduling node and wherein causing at least one of the relays of the subset to relay between the at least one source and the at least one destination during the activation interval comprises signaling by the scheduling node each of the selected relays to relay from its paired source or sources.

8. The method of claim 6, wherein the activation interval spans at least two consecutive slots and the source-relay pairing changes during the activation interval, while the relay transmission energy per activation interval constraint is satisfied.

9. The method of claim 1, wherein selecting the subset of the plurality of relays comprises forming a matrix of effective channel from each of the at least one source to destination through each of the plurality of relays that are available to the destination, and selecting the subset from the effective channel matrix.

10. The method of claim 9, wherein there are at least two sources and wherein selecting the subset of the plurality of relays further comprises selecting whether and which of the sources to pair to the subset of relays by evaluating utility for pairing each individual source $k_1$ to an individual relay $k_2$ according to $$\gamma_{k1,k2} = \begin{cases} \gamma_{k1}(2) + \gamma_{k2}(2) & \text{if } k_1 \neq k_2, \\ \gamma_{k2}(1) & \text{if } k_1 = k_2 \end{cases}$$

wherein $\gamma$ is a signal to noise ratio.

11. The method of claim 10, wherein the utility for pairing further depends on evaluating performance of a multiple-input-multiple-output channel between two of the relays and the at least one destination.

12. The method of claim 10, wherein selecting the subset of the plurality of relays comprises solving $$\max_{x_{k,j}} \sum_k \sum_j \gamma_{k,j} x_{k,j},$$

wherein $x_{k,j}$ is an element of a permutation matrix $X=(x_{k,j})$ for user k and relay j.

13. The method of claim 1, executed by the at least one of the relays without control signaling from a scheduling network node that informs of relay selection, and wherein causing the at least one of the relays of the subset to relay comprising transmitting to the at least one destination during the activation interval data that was received from the at least one source.

14. A device comprising:
a processor configured to determine from received transmissions a plurality of relays that are available between at least one source and at least one destination;
the processor further configured to select a subset of the plurality of relays for an activation interval comprising a predetermined time interval, under a constraint that comprises relay transmit energy per activation interval, wherein the relay transmit energy during an activation interval remains the same throughout the activation interval and wherein each relay selected for the subset is selected based at least in part on the relay's available power designated for relaying, and wherein the subset comprises more than one of the plurality of relays; and
a transmitter configured to cause at least one of the relays of the subset to relay between the at least one source and the at least one destination during the activation interval.

15. The device of claim 14, wherein the constraint that comprises relay transmit energy per activation interval provides for substantially equal transmit energy for the selected relays with respect to one another during the activation interval.

16. The device of claim 14, wherein the processor is configured to select the subset of the plurality of relays by evaluating an effective channel from the at least one source to the at least one destination via multiple feasible subsets of the plurality of relays.

17. The device of claim 16, wherein the processor is configured to evaluate the effective channel by using channel state information that is received from each of the plurality of relays that are available.

18. The device of claim 17, wherein the processor is configured to evaluate the effective channel using a two-hop multi-input multi-output capacity equation.

19. The device of claim 14, wherein the at least one source comprises a plurality of sources, and wherein the processor is configured to select the subset of the plurality of relays by selecting individual relays and source-relay pairs.

20. The device of claim 19, wherein the device comprises a scheduling node and the transmitter causes at least one of the relays of the subset to relay between the at least one source and the at least one destination by signaling each of the selected relays to relay from its paired source or sources.

21. The device of claim 19, wherein the activation interval spans at least two consecutive slots and the source-relay pairing changes during the activation interval, while the relay transmission energy per activation interval constraint is satisfied.

22. The device of claim 14, wherein the processor is configured to select the subset of the plurality of relays by forming a matrix of effective channel from each of the at least one source to destination through each of the plurality of relays that are available to the destination, and to select the subset from the effective channel matrix.

23. The device of claim 22, wherein there are at least two sources and wherein the processor is configured to select the subset of the plurality of relays by selecting whether and which of the sources to pair to the subset of relays by evaluating utility for pairing each individual source $k_1$ to an individual relay $k_2$ according to $$\gamma_{k1,k2} = \begin{cases} \gamma_{k1}(2) + \gamma_{k2}(2) & \text{if } k_1 \neq k_2, \\ \gamma_{k2}(1) & \text{if } k_1 = k_2 \end{cases}$$

wherein $\gamma$ is a signal to noise ratio.

24. The device of claim 23, wherein the utility for pairing further depends on evaluating performance of a multiple-input-multiple-output channel between two of the relays and the at least one destination.

25. The device of claim 23, wherein the processor is configured to select the subset of the plurality of relays by solving $$\max_{x_{k,j}} \sum_k \sum_j \gamma_{k,j} x_{k,j},$$

wherein $x_{k,j}$ is an element of a permutation matrix $X=(x_{k,j})$ for user k and relay j.

26. The device of claim 14, wherein the device comprises the at least one of the relays of the subset that relays between the at least one source and the at least one destination during the activation interval.

27. A non-transitory computer readable memory embodying a program of instructions for causing a processor to take actions directed toward selecting relays, the actions comprising:
determining a plurality of relays that are available between at least one source and at least one destination;
selecting a subset of the plurality of relays for an activation interval comprising a predetermined time interval, wherein the subset comprises more than one of the plurality of relays, under a constraint that comprises relay transmit energy per activation interval, wherein the relay transmit energy during an activation interval remains the same throughout the activation interval and wherein each relay selected for the subset is selected based at least in part on the relay's available power designated for relaying; and causing at least one of the relays of the subset to relay between the at least one source and the at least one destination during the activation interval.

28. The computer readable memory of claim 27, wherein the constraint that comprises relay transmit energy per activation interval provides for substantially equal transmit energy for the selected relays with respect to one another during the activation interval.

29. The computer readable memory of claim 27, wherein selecting the subset of the plurality of relays further comprises evaluating an effective channel from the at least one source to the at least one destination via multiple feasible subsets of the plurality of relays.

30. The computer readable memory of claim 29, wherein evaluating the effective channel comprises using channel state information received at the at least one destination from each of the plurality of relays that are available.

31. The computer readable memory of claim 27, wherein the at least one source comprises a plurality of sources, and wherein selecting the subset of the plurality of relays comprises selecting individual relays and source-relay pairs.

32. The computer readable memory of claim 27, wherein selecting the subset of the plurality of relays comprises forming a matrix of effective channel from each of the at least one source to destination through each of the plurality of relays that are available to the destination, and selecting the subset from the effective channel matrix.

33. The computer readable memory of claim 32, wherein there are at least two sources and wherein selecting the subset of the plurality of relays further comprises selecting whether and which of the sources to pair to the subset of relays by evaluating utility for pairing each individual source $k_1$ to an individual relay $k_2$ according to $$\gamma_{k1,k2} = \begin{cases} \gamma_{k1}(2) + \gamma_{k2}(2) \; if k_1 \neq k_2, \\ \gamma_{k2}(1) \; if k_1 = k_2 \end{cases}$$

wherein $\gamma$ is a signal to noise ratio, wherein the utility for pairing further depends on evaluating performance of a multiple-input-multiple-output channel between two of the relays and the at least one destination;

and wherein selecting the subset of the plurality of relays comprises solving $$\max{}_{x k,j} \sum_k \sum_j \gamma_{k,j} x_{k,j},$$

wherein $x_{k,j}$ is an element of a permutation matrix $X=(x_{k,j})$ for user k and relay j.

* * * * *